:::
United States Patent Office 3,064,765
Patented Nov. 20, 1962

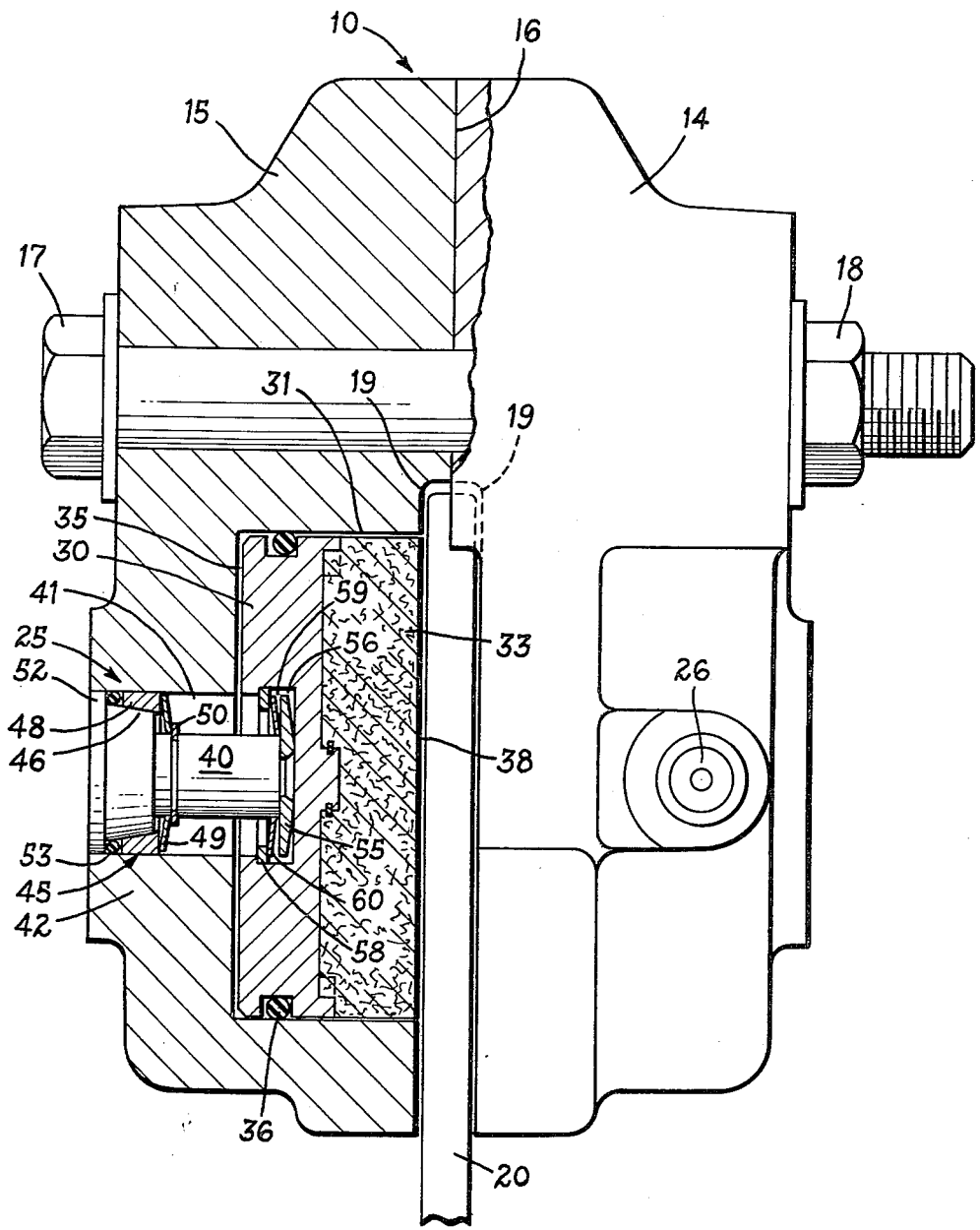

3,064,765
AUTOMATIC BRAKE ADJUSTING MECHANISM
Gianni A. Dotto, Dayton, Ohio, assignor to The Dayton Steel Foundry Company, Dayton, Ohio, a corporation of Ohio
Filed Dec. 14, 1959, Ser. No. 859,492
4 Claims. (Cl. 188—73)

This invention pertains to brakes and more particularly to hydraulic brake application and release devices.

It is a principal object of this invention to provide a simplified brake hydraulic unit that operates to maintain a minimum running clearance between the brake lining and the relatively moving braking surfaces between successive applications of the brake. This is accomplished in this invention by the provision of a primary brake operating piston connected to a secondary piston having a frictional connection with the body of the brake. The secondary piston is movable in one direction relative to the body to compensate for lining wear and in the opposite direction under the influence of hydraulic pressure to compensate for the deflection and change of dimensions of the brake components due to heat and stress.

A further object of this invention is to provide a brake having a brake retraction unit as outlined above with a primary and secondary piston incorporating a simplified drag seat between the secondary piston and the body of the brake. The drag seat is arranged so that the force of the drag for any given direction of relative movement between the secondary piston and the body is determinable.

Another object of this invention is to provide a brake having a brake retraction unit as outlined above with a simplified connection between a primary and a secondary cylinder defining a retraction gap therebetween operating to withdraw the primary piston by means of a retraction spring within the gap.

Other objects and advantages of the invention will be apparent from the following description, the accompanying drawing and the appended claims.

In the drawing:
The single figure of the drawing is a view partially in section of the brake of this invention.

Referring to the drawing, which illustrates a preferred embodiment of the invention, a disk brake is shown as including a relatively fixed body 10 divided into a right-hand body section 14 and a left-hand body section 15. The sections 14 and 15 are held in abutting relation along adjoining faces by a bolt 17 and a nut 18. The body sections 14 and 15 each have a cooperative relieved portion 19 forming a gap through which a brake disk 20 rotates.

Brake operating means by which a retarding force is applied to the disk 20 includes a pair of brake actuating mechanisms 25, one each positioned in each of the body sections 14 and 15. The mechanisms 25 operate upon the simultaneous application of hydraulic fluid pressure thereto through fluid inlets 26 (one shown) to effect the frictional application of braking material to opposite sides of the disk 20. It is understood that, if desired, the disk 20 may be made axially movable on its shaft and only one mechanism 25 employed in one of the sections 14 and 15, the section merely holding a fixed pad of friction material for reactive coaction with the adjacent face of the disk upon the application of hydraulic pressure to the single mechanism 25.

The mechanism 25 includes a primary force applying piston 30 arranged for reciprocal movement within a cylinder 31 formed in the body section 15 adjacent the disk 20. The piston 30 carries a pad 33 of friction material on its outer face adjacent the disk 20 and is movable within the cylinder 31 to move the pad 33 into frictional engagement with the disk 20 upon the application of hydraulic pressure through the inlet 26 into the space indicated at 35 behind the piston 30. The applied hydraulic pressure is prevented from escape by an O-ring seal 36 between the primary piston and the wall of the cylinder 31.

Secondary piston means associated with the primary piston is provided to maintain a minimum running clearance indicated at 38 between the pad 33 and the adjacent face of the disk 20 at all times when the hydraulic pressure is released. This consists of a secondary piston 40 relatively movably positioned within a cylindrical opening 41 in the wall 42 of the section 15 in coaxial relation to the cylinder 31. The secondary piston 40 is arranged to present a smaller effective area to the hydraulic pressure as compared to the primary piston 30.

The secondary piston 40 is in frictional engagement with the body section 15 by means of a drag seat indicated generally at 45. The drag seat 45 includes an inclined annular outer surface or ramp 46 formed on the piston 40. An expanding ring 48 has a sloped inner surface for cooperative engagement with the ramp 46 and may be split for movement on the ramp. The incline of the ramp 46 and the slope of the ring 48 are coincidental and converge in the direction of the application of the braking force. The outer surface of the ring 48 is circular for coaction with the inside surface of the opening 41. The ring 48 is urged onto the ramp in wedging relation between the piston 40 and the section 15 by means of a belleville spring or washer 49 held in compression by a snap ring 50 on the piston 40. The exposed end of the piston 40 conforms generally to the opening 41 and forms an annular lip 52. An O-ring 53 is positioned in the space between the lip 52 and the ring 48 to provide a fluid tight seal for the secondary piston 40.

The secondary piston 40 is connected to the primary piston 30 through a lost motion connection which provides for an inner position establishing the running clearance 38 and an outer position of the secondary piston with respect to the primary pistons. This connection is effected by means of a head or cap 55 threaded into the inner end of the piston 40 and arranged for limited movement within a cylindrical opening or recess 56 formed within the back of the piston 30. The cap 55 is retained within the recess 56 of the primary piston 30 by means of a snap ring 58 within the opening 56. The head 55 cooperates with the ring 58 to form a retraction gap therebetween indicated generally at 59 with the primary piston 30 in its inner position shown. A belleville spring or washer 60, comprising a retraction spring, is interposed between the head and the washer to bias the primary piston 30 into the inner limit position.

The drag between the secondary piston 40 and the section 15 effected through the drag seat 45 may be regulated or controlled by the compression of the spring 49, by the slope of the ramp 46 or by the material of the body or the ring 48. This drag may not, nor need not, be the same in each direction of relative movement. However, for relative movement upon the application of the brake carrying the primary and secondary pistons to the right and tending to ride the ring 48 higher up on the ramp 46, the applied drag should be considerably less than the available force of the primary piston 30 but greater than the force of the retraction spring 60 so that the retraction spring is always first compressed before the secondary piston 40 is moved through the drag seat 45. Also, drag or resistance to relative movement of the secondary piston 40 to the left through the darg seat 45 should be less than the available force applicable to the secondary piston by the hydraulic pressure. As an example, the drag seat 45 may require a pull of 200 lbs. to effect the relative movement by the primary piston and may exert a drag of 50 lbs. in the opposite direction.

In the operation of this invention, a moderate braking situation will first be described. Hydraulic pressure is applied through the inlet 26 to move the primary piston 30 from its retracted inner position with respect to the secondary piston 40 first to take up the retraction clearance or gap 59 against the resistance of the retraction spring 60. This movement is usually effective to apply the friction material 33 to the adjacent surface of the disk 20. If further braking is needed, an increase in hydraulic pressure effects the continued movement of the primary piston 30 with concomitant compression of the pad 33 against the disk 20 by drawing the secondary piston 40 to the right through the drag seat 45. When the brake is released by the release of the hydraulic pressure, the gap 59 is reestablished by the retracting movement of the primary piston 30 to the left under the influence of the retraction spring 60. Any pad or lining wear which has occurred has been compensated for by the repositioning of the secondary piston 40 in the body section 15 through the drag seat 45. The depth to which the piston 40 has moved within the opening 41 provides a simple visual check of the extent of wear on the pad 33.

In the case of heavier braking applications, the secondary piston 40 will be carried through the drag seat 45 to the right to an extent which exceeds the ability of the retraction spring 60 working through the fixed gap 59 to relieve the pressure on the lining and to reestablish the running clearance 38. Under severe braking applications, the body sections 14 and 15 are under considerable stress due to the hydraulic pressure and will be deformed or deflected so as to move outwardly from each other and from the disk 20. This deformation is elastic, and the sections 14 and 15 will assume their normal positions upon the release of the pressure. However, this deflection has resulted in relative movement of the secondary piston 40 within the opening 41 to absorb this deformation in order to maintain the pad pressure on the disk, and this movement may be considered as an over-travel which must be corrected by a reverse movement of the secondary piston 40 on the drag seat 45. Also, the lining pad 33, the disk 20, and other of the brake components expand with heat, and this expansion requires a further change in relation between the piston 40 and the body.

The secondary piston 40 provides the means by which the normal running clearance 38 is maintained between each successive application of the brakes. In particular, the secondary piston 40 is effective under the influence of hydraulic pressure to move in the opposite direction to reestablish the lost running clearance caused by the elastic deformation of the body under stress, or by any other cause. During the release of the brakes, the hydraulic pressure does not immediately fall to zero but decays over a finite time period. This pressure, operating upon the effective area of the secondary piston 40, is sufficient to overcome the rearward resistance of the drag seat 45 and, at the same time, to hold the retraction spring 60 in compression so that the pistons 30 and 40 may move together to the left relative to the body section 15. The effective area of the secondary piston 40 exposed to the hydraulic pressure is correlated with the drag so as to maintain the closure of the gap 59 during at least a portion of the release of the brake. Therefore, although the hydraulic pressure has decreased sufficiently to provide for the relative return of the primary piston 30 within the cylinder 31, it is momentarily sufficient during at least a part of this time to maintain the compression of the retraction spring 60 and to move the piston 40 through the drag seat 45, thus reserving the operation of the retraction spring 60 until such time as the gap 59 is sufficient to provide the running clearance between the pad 33 and the disk 20.

It is therefore seen that this invention provides a brake with a hydraulic retraction mechanism which is of simple and positive design, utilize a minimum of precision components. The split ring 48 of the drag seat may be formed of aluminum which is sufficiently soft so as not to damage the surface of the opening 41, usually made of cast iron, and at the same time provides a uniform and consistent drag over an extended period of use. Also, the ring may be formed of nylon or polytetrafluoroethylene, sold under the trade name of Teflon, in order to take advantage of the self-lubricating qualities of these materials. The ring 48 may also be made continuous without a split by suitably choosing or forming the material of the ring as to provide sufficient elasticity for expansion within the bore 41 on the ramp 46.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A hydraulic disk brake comprising a body, a relatively rotatable disk having at least a portion thereof adjacent said body, a pad of friction material interposed between said disk and said body and movable into frictional engagement with said disk, a hydraulic actuator in said body having a primary piston arranged to move said pad into frictional engagement with said disk upon the application of fluid pressure to said primary piston, a secondary piston associated with said primary piston relatively movable with respect to said body and having a smaller area subject to said fluid pressure than said primary piston, frictional drag means interposed between said secondary piston and said body for frictional engagement with said body upon the movement of said secondary piston, means including a connection between said primary and secondary pistons providing for limited movement of said primary piston between inner and outer limit positions with respect to said secondary piston, retraction means urging said primary piston into said inner limit position in a direction away from said disk to establish a normal running clearance between said pad and said disk, said primary piston being movable upon the application of fluid pressure first to said outer limit position against said retraction means and further to effect relative movement of said secondary piston and said body through said drag means to establish and maintain contact of said friction material on said disk irrespective of pad wear and deflection of said body under stress, said area of said secondary piston being correlated with the frictional drag of said drag means and the force of said retraction means so as to maintain said outer position in relation to said primary piston while retracting with said primary piston through said drag means during the release of said brake to take up any excess travel of said secondary piston effected during the application of said brake.

2. A hydraulic brake comprising a fixed body, a relatively moving brake member adjacent said body, a primary piston in said body arranged to apply a braking force to said member upon the application of hydraulic fluid pressure to said primary piston, means in said body defining an axial bore of reduced diameter than said primary piston, a secondary piston subject to said pressure received within said bore, friction engagement means between said secondary piston and said bore including an expanding ring carried for movement on said secondary piston in cammed relation directly against said body at said bore providing a drag resisting relative movement of said secondary piston to said bore, means connecting said primary piston to said secondary piston for movement between an inner position establishing a running clearance with said member and an outer braking position, retraction means biasing said primary piston to said inner position, and said secondary piston having an effective area exposed to said hydraulic pressure correlated with said drag and the force of said retraction means so as to maintain the relation of said pistons at said outer position against said retraction means during a portion of the release of said hydraulic pressure.

3. A hydraulic brake comprising a fixed body, a relatively moving brake member adjacent said body, a primary piston in said body arranged to apply a braking force to said member upon the application of hydraulic fluid pressure to said primary piston, means in said body defining an axial bore of reduced diameter than said primary piston, a secondary piston subject to said pressure received within said bore, a drag seat between said secondary piston and said bore including an inclined annular ramp formed on said secondary piston and a ring having a sloped inner surface for cooperative engagement with said ramp, the incline of said ramp and the slope of said ring being coincidental and converging in the direction of the application of said braking force, means biasing said ring onto said ramp in wedging relation between said secondary piston and said body at said bore, means connecting said primary piston to said secondary piston for movement between an inner position establishing a running clearance with said member and an outer braking position, retraction means biasing said primary piston to said inner position, and said secondary piston having an effective area exposed to said hydraulic pressure correlated with the friction effected by said drag seat and the force of said retraction means so as to maintain the relation of said pistons at said outer position against said retraction means during a portion of the release of said hydraulic pressure.

4. A hydraulic brake comprising a fixed body, a relatively moving brake member adjacent said body, a primary piston in said body arranged to apply a braking force to said member upon the application of hydraulic fluid pressure to said primary piston, means in said body defining an axial bore of reduced diameter than said primary piston, a secondary piston subject to said pressure received within said bore, a drag seat between said secondary piston and said bore including an inclined annular ramp formed on said secondary piston and a ring having a sloped inner surface for cooperative engagement with said ramp, the incline of said ramp and the slope of said ring being coincidental and converging in the direction of the application of said braking force, an annular lip formed on said piston adjacent the high side of said ramp conforming generally to said bore, a sealing ring positioned on said piston between said lip and said ring for sealing said secondary piston at said body, means biasing said ring of said drag seat onto said ramp in wedging relation between said secondary piston and said body at said bore, means connecting said primary piston to said secondary piston for movement between an inner position establishing a running clearance with said member and an outer braking position, retraction means biasing said primary piston to said inner position, and said secondary piston having an effective area exposed to said hydraulic pressure correlated with the friction effected by said drag seat and the force of said retraction means so as to maintain the relation of said pistons at said outer position against said retraction means during a portion of the release of said hydraulic pressure.

References Cited in the file of this patent
UNITED STATES PATENTS

| | | |
|---|---|---|
| 2,531,341 | Meador | Nov. 21, 1950 |
| 2,801,712 | Lockhart | Aug. 6, 1957 |
| 2,803,314 | Halibrand | Aug. 20, 1957 |
| 2,905,277 | Cagle | Sept. 22, 1959 |
| 2,995,216 | Jeffries | Aug. 8, 1961 |

FOREIGN PATENTS

| | | |
|---|---|---|
| 804,826 | Great Britain | Nov. 26, 1958 |